(12) United States Patent
Schmidt et al.

(10) Patent No.: US 9,358,823 B2
(45) Date of Patent: Jun. 7, 2016

(54) BRAILLE ERASURE MECHANISM

(71) Applicant: Perkins School for the Blind, Watertown, MA (US)

(72) Inventors: Michael Schmidt, Shelby Township, MI (US); Jude Jonas, Waltham, MA (US)

(73) Assignee: Perkins School for the Blind, Watertown, MA (US)

( * ) Notice: Subject to any disclaimer, the term of this patent is extended or adjusted under 35 U.S.C. 154(b) by 251 days.

(21) Appl. No.: 14/074,236

(22) Filed: Nov. 7, 2013

(65) Prior Publication Data

US 2014/0126946 A1     May 8, 2014

Related U.S. Application Data

(62) Division of application No. 12/898,651, filed on Oct. 5, 2010, now Pat. No. 8,602,787.

(51) Int. Cl.
| | | |
|---|---|---|
| *G09B 21/00* | (2006.01) | |
| *B41M 3/16* | (2006.01) | |
| *G09B 21/02* | (2006.01) | |

(52) U.S. Cl.
CPC . *B41M 3/16* (2013.01); *G09B 21/02* (2013.01)

(58) Field of Classification Search
USPC ................................. 434/113, 114; 400/109.1
See application file for complete search history.

(56) References Cited

U.S. PATENT DOCUMENTS

| | | | |
|---|---|---|---|
| 1,767,247 A | | 6/1930 | Kurowski et al. |
| 1,822,938 A | | 9/1931 | Smith |
| 1,931,840 A | * | 10/1933 | Campbell ................. B41B 1/02 101/28 |
| 2,549,293 A | | 4/1951 | De La Fuente |
| 2,565,608 A | * | 8/1951 | Hoff ....................... G09B 21/02 101/3.1 |
| 3,235,055 A | | 2/1966 | Pagenkopf |
| 3,254,750 A | | 6/1966 | Goldner |
| 3,381,789 A | * | 5/1968 | Hawes .................... B65C 11/02 101/227 |
| 3,640,368 A | * | 2/1972 | Weinberger ................ B41J 3/32 400/109.1 |
| 3,910,397 A | | 10/1975 | Harding |
| 4,101,688 A | * | 7/1978 | Kurtzman ................ B41M 3/16 427/145 |
| 4,159,677 A | * | 7/1979 | Smith .................... B44B 5/0009 101/23 |
| 4,204,468 A | * | 5/1980 | Harrison .................. B41K 3/40 101/31.1 |
| 4,307,971 A | * | 12/1981 | Kane, III .................. B41J 29/36 400/144.2 |

(Continued)

OTHER PUBLICATIONS

Notice of Allowance on U.S. Appl. No. 12/898,651 dated Aug. 7, 2013.

(Continued)

*Primary Examiner* — Melba Bumgarner
*Assistant Examiner* — Joseph B Baldori
(74) *Attorney, Agent, or Firm* — Daniel E. Rose; Foley & Lardner LLP

(57) ABSTRACT

An improved Braille erasure mechanism may comprise a reverse-embosser or impressing mechanism to imprint a negative Braille cell. A negative Braille cell is the reverse of a normal Braille cell, with one or more dots lowered or pressed into the printing medium in an opposite direction to the raised dots of a normal Braille cell. Because the dots of a negative Braille cell are lowered past the surface of the printing medium, they may be ordinarily undetectable to the fingers of a Braille user. Accordingly, by imprinting a full negative Braille cell on top of a Braille cell to be erased, all of the previously raised dots of the Braille cell may be lowered beyond the surface of the printing medium. Any further Braille cell embossed over the erased cell will be free from corruption, because any dot not used by the new cell will remain lowered and undetectable.

13 Claims, 11 Drawing Sheets

(56) References Cited

U.S. PATENT DOCUMENTS

| | | | | |
|---|---|---|---|---|
| 4,488,828 A | * | 12/1984 | Ohtsuki | B41J 3/51 400/109.1 |
| 4,500,293 A | | 2/1985 | Eltgen | |
| 4,573,926 A | | 3/1986 | Okada | |
| 4,653,942 A | * | 3/1987 | Soloveychik | B41J 3/32 400/109.1 |
| 4,859,094 A | * | 8/1989 | Okada | G09B 21/02 101/368 |
| 4,898,536 A | | 2/1990 | Hoffarth | |
| 5,193,921 A | * | 3/1993 | Tsukuda | B41J 3/32 400/109.1 |
| 5,209,584 A | * | 5/1993 | Galarneau | B41J 3/32 101/18 |
| 5,217,338 A | | 6/1993 | Czubek | |
| 5,244,288 A | * | 9/1993 | Nagaoka | G09B 21/003 400/109.1 |
| 5,449,240 A | * | 9/1995 | Dorpfeld | B41J 3/32 101/3.1 |
| 5,636,565 A | * | 6/1997 | Lawrance | B31F 1/07 101/32 |
| 5,685,721 A | * | 11/1997 | Decker | G09B 21/003 434/114 |
| 5,702,559 A | * | 12/1997 | Bright | B41J 3/32 156/212 |
| 5,720,616 A | | 2/1998 | Schuler, III | |
| 5,746,518 A | * | 5/1998 | Ogawa | B41J 3/32 400/109.1 |
| 5,858,143 A | * | 1/1999 | Bright | B65C 3/16 156/218 |
| 5,876,128 A | * | 3/1999 | Ogawa | B41J 3/32 400/109.1 |
| 6,086,273 A | | 7/2000 | Hong | |
| 6,170,184 B1 | * | 1/2001 | Treu | G09B 21/003 40/584 |
| 6,217,338 B1 | * | 4/2001 | Tieman | G09B 21/004 434/112 |
| 6,247,400 B1 | | 6/2001 | Litschel et al. | |
| 6,417,821 B1 | * | 7/2002 | Becker | G09B 21/003 340/407.1 |
| 7,112,000 B2 | * | 9/2006 | Kurashina | B41J 3/32 400/109.1 |
| 7,556,444 B2 | * | 7/2009 | Kurashina | B41J 3/32 400/109.1 |
| 7,695,203 B2 | * | 4/2010 | Takayama | B41J 3/32 400/109 |
| 7,744,372 B1 | * | 6/2010 | Minnich | G09B 21/003 434/113 |
| 7,812,979 B2 | * | 10/2010 | Takada | B41J 3/32 345/581 |
| 2002/0009318 A1 | * | 1/2002 | Maie | B41J 3/32 400/109.1 |
| 2002/0124753 A1 | * | 9/2002 | Hadden | B41K 1/04 101/405 |
| 2002/0162464 A1 | * | 11/2002 | Davis | B44B 5/0057 101/3.1 |
| 2004/0175677 A1 | * | 9/2004 | Koch | G09B 21/004 434/113 |
| 2005/0079472 A1 | * | 4/2005 | Shimamura | G09B 21/025 434/114 |
| 2005/0238403 A1 | * | 10/2005 | Kurashina | B41J 3/32 400/109.1 |
| 2005/0281599 A1 | | 12/2005 | Akaiwa | |
| 2006/0000372 A1 | | 1/2006 | Akaiwa | |
| 2006/0153619 A1 | * | 7/2006 | Kurashina | B41J 3/32 400/109.1 |
| 2006/0228146 A1 | * | 10/2006 | Takayama | B41J 3/32 400/109.1 |
| 2006/0228678 A1 | | 10/2006 | Tanaka et al. | |
| 2006/0230951 A1 | * | 10/2006 | Petersen | B44B 5/0085 101/28 |
| 2007/0072758 A1 | | 3/2007 | Van Oosterhout | |
| 2009/0129843 A1 | | 5/2009 | Pillischer | |
| 2009/0274505 A1 | * | 11/2009 | Morgan | B41J 3/32 400/109.1 |
| 2010/0047002 A1 | * | 2/2010 | Schleppenbach | G09B 21/02 400/109.1 |
| 2011/0248492 A1 | * | 10/2011 | Kittredge | B42D 25/355 283/81 |
| 2011/0253029 A1 | * | 10/2011 | Hagberg | G09B 21/003 116/205 |
| 2012/0199020 A1 | * | 8/2012 | Nakata | B31F 1/07 101/28 |
| 2012/0304875 A1 | | 12/2012 | Pillischer et al. | |
| 2013/0174750 A1 | * | 7/2013 | Foppapedretti | B41J 3/32 101/28 |

OTHER PUBLICATIONS

Office Action on U.S. Appl. No. 12/898,651 dated Mar. 19, 2013.
US Office Action for U.S. Appl. No. 14/074,223 dated Feb. 2, 2015.
US Office Action in U.S. Appl. No. 14/074,223 DTD Oct. 22, 2015.
US Office Action on U.S. Appl. No. 14/074,223 DTD Jun. 9, 2015.

* cited by examiner

BRAILLE ERASURE MECHANISM

RELATED APPLICATIONS

The present application claims priority to and is a divisional of co-pending U.S. patent application Ser. No. 12/898,651, entitled "Braille Erasure Mechanism," filed Oct. 5, 2010, the entirety of which is hereby incorporated by reference.

FIELD OF THE INVENTION

The present disclosure relates to methods and systems for writing and embossing with Braille. In particular, the present disclosure relates to a Braille erasure mechanism for erasing embossed Braille cells.

BACKGROUND OF THE INVENTION

Braille was invented more than 175 years ago to provide a system that blind people can use to read and write. Braille is a system of raised dots that can be read very quickly with the fingers. Braille embossing involves pressing one or more pins of a set of blunted embossing pins arranged in a Braille cell into a printing medium, such as a sheet of heavy paper, to stretch the printing medium and create a corresponding one or more raised dots. Early manual systems for writing in Braille included a slate with holes arranged in rows of Braille cells and means for securing a piece of paper to the slate, and a blunted awl or stylus which was pressed into the paper to create the raised dot or dots, using the holes in the slate as a guide. Later, mechanical impact printers or Braille embossers were created to increase speed and efficiency of embossing, the first such embosser being the Perkins Brailler, originally manufactured in 1951 by the Perkins School for the Blind, based in Watertown, Mass. Currently, Braille writers exist in either mechanical or electronic formats. Examples of the former include the Braille Writer manufactured by the Perkins School for the Blind; the Tatrapoint and Jot-A-Dot writers manufactured by Quantum Technology of Rydalmere, Australia; the Erika Picht mechanical Braille writer manufactured by Blista-Brailletec gGmbH of Marburg, Germany; and the Lavender Braille Writer manufactured by American Printing House for the Blind, Inc. of Louisville, Ky. Examples of electronic Braille writers include the Mountbatten from Quantum Technology of Rydalmere, Australia.

Few ways exist to effectively erase an embossed Braille cell from a printing medium. Originally, a user of a Braille slate and stylus or mechanical Braille writer would press or rub their finger or a blunt instrument against an incorrectly embossed cell to press the raised dots of the cell back to a flattened state. Later, both mechanical and electrical Braille writers would incorporate similar erase mechanisms in which the embossed cell was pressed between two flat plates to press the dots back to a flattened state. However, these methods frequently fail to fully flatten or erase one or more dots of the cell. As a result, a cell printed over the poorly-erased cell may be corrupted.

SUMMARY OF THE INVENTION

Rather than attempting to flatten one or more raised dots of an embossed Braille cell, an improved Braille erasure mechanism may comprise a reverse-embosser or impressing mechanism to imprint a negative Braille cell. A negative Braille cell is the reverse of a normal Braille cell, with one or more dots lowered or pressed into the printing medium in an opposite direction to the raised dots of a normal Braille cell. For example, a full negative Braille cell may comprise six or eight dots, depending on Braille format, arranged in the Braille cell and impressed or lowered into the printing medium. Because the dots of a negative Braille cell are lowered past the surface of the printing medium, they may be ordinarily undetectable to the fingers of a Braille user. Accordingly, by imprinting a full negative Braille cell on top of a Braille cell to be erased, all of the previously raised dots of the Braille cell may be lowered beyond the surface of the printing medium. Any further Braille cell embossed over the erased cell will be free from corruption, because any dot not used by the new cell will remain lowered and undetectable.

In one aspect, the present disclosure describes an erasure assembly for erasing an embossed Braille cell. The erasure assembly includes a first plate comprising a plurality of indents arranged in a full Braille cell. The erasure assembly also includes a second plate comprising a corresponding plurality of raised elements arranged in a full Braille cell. The erasure assembly further includes an actuator for pressing the first plate and the second plate together.

In one embodiment, the erasure assembly includes the first plate and second plate oriented to impress a negative Braille cell on a printing medium when pressed together by the actuator. In another embodiment, the erasure assembly includes one or more springs attached to the actuator to return the second plate to a position separated from a printing medium after impressing the negative Braille cell on the printing medium.

In some embodiments, the erasure assembly includes an attachment to a Braille embossing mechanism, the attachment fixing the erasure assembly at a predetermined distance from an embossing location of the Braille embossing mechanism. In a further embodiment, the predetermined distance is a spacing between two cells in a Braille system. In other embodiments, the erasure assembly includes one or more guide elements arranged to orient a face of the first plate parallel to a face of the second plate.

In another aspect, the present disclosure features a Braille writer. The Braille writer includes a chassis supporting a plurality of finger operated keys, each key mechanically interconnected with an embossing mechanism so that depression of a key causes a corresponding one of a plurality of pins in the embossing mechanism to extend outwardly from the embossing mechanism to create a raised dot on paper adjacent to the embossing mechanism. The Braille writer also includes an erase mechanism, comprising a first plate adjacent to the embossing mechanism comprising a plurality of indents arranged in a full Braille cell, a second plate placed in opposition to the first plate and comprising a corresponding plurality of raised elements arranged in a full Braille cell, and an actuator for pressing the first plate and the second plate together.

In one embodiment, the Braille writer includes the first plate and second plate oriented such that compressing the paper between the first plate and second plate creates a plurality of lowered dots on the paper. In another embodiment, the Braille writer includes the plurality of indents arranged in a full Braille cell fixed at a predetermined distance from the plurality of pins in the embossing mechanism. In a further embodiment, the predetermined distance is a spacing between two cells in a Braille system. In yet another embodiment, the erase mechanism of the Braille writer includes one or more springs attached to the actuator to return the second plate to a position separated from the paper.

In yet another aspect, the present disclosure features a method of erasing an embossed Braille cell. The method includes positioning an erase mechanism adjacent to a Braille cell embossed on a printing medium, the erase mechanism comprising a first plate with a plurality of raised elements arranged in a full Braille cell, a second plate with a corresponding plurality of indents arranged in a full Braille cell, and an actuator for pressing the first plate and the second plate together, the first plate placed alongside the raised side of the embossed Braille cell. The method also includes compressing the Braille cell embossed on the printing medium between the first plate and second plate to create a negative full Braille cell.

In one embodiment, the method includes positioning the plurality of raised elements of the first plate in opposition to one or more raised elements of the embossed Braille cell. In another embodiment, the erase mechanism is attached to a Braille embossing mechanism and the method includes positioning the erase mechanism by moving the Braille embossing mechanism by a distance of one or more widths of a Braille cell. In yet another embodiment, the method includes impressing a full Braille cell in the same location as the embossed Braille cell, such that one or more raised dots of the embossed Braille cell are lowered beyond a surface of the printing medium.

The details of various embodiments of the invention are set forth in the accompanying drawings and the description below.

Figure 1A:
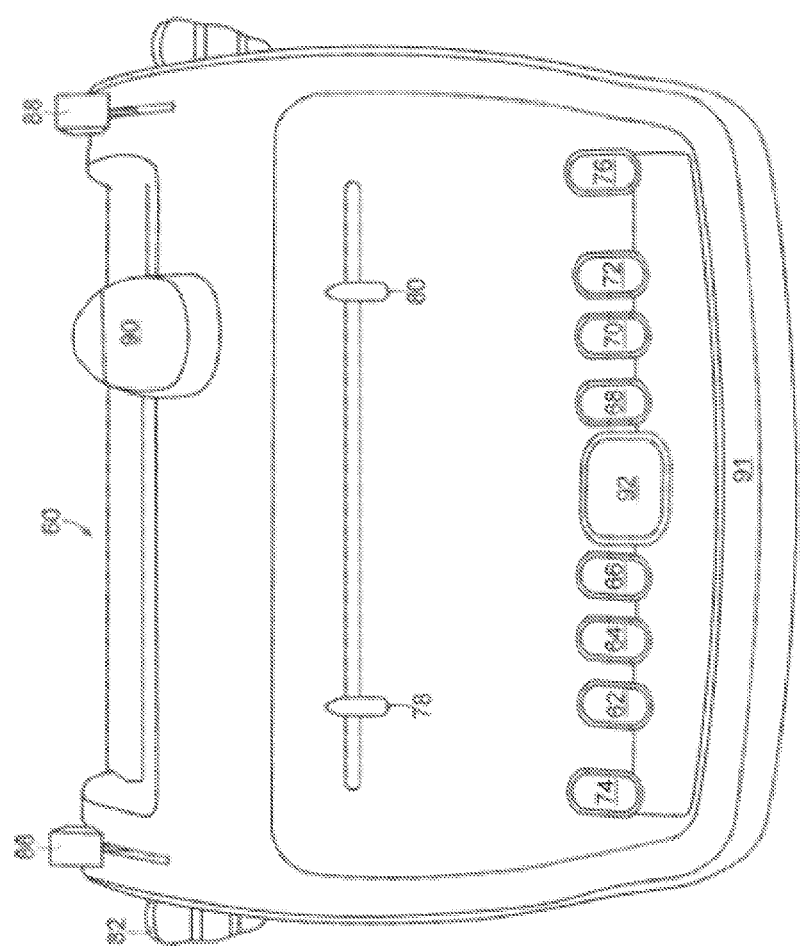
FIG. 1A is a block diagram of a perspective view of an embodiment of a mechanical Braille writer.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes embodiments of mechanical Braille writers; and

Section B describes embodiments of a Braille erasure mechanism.

A. Mechanical Braille Writer

Figure 1B:
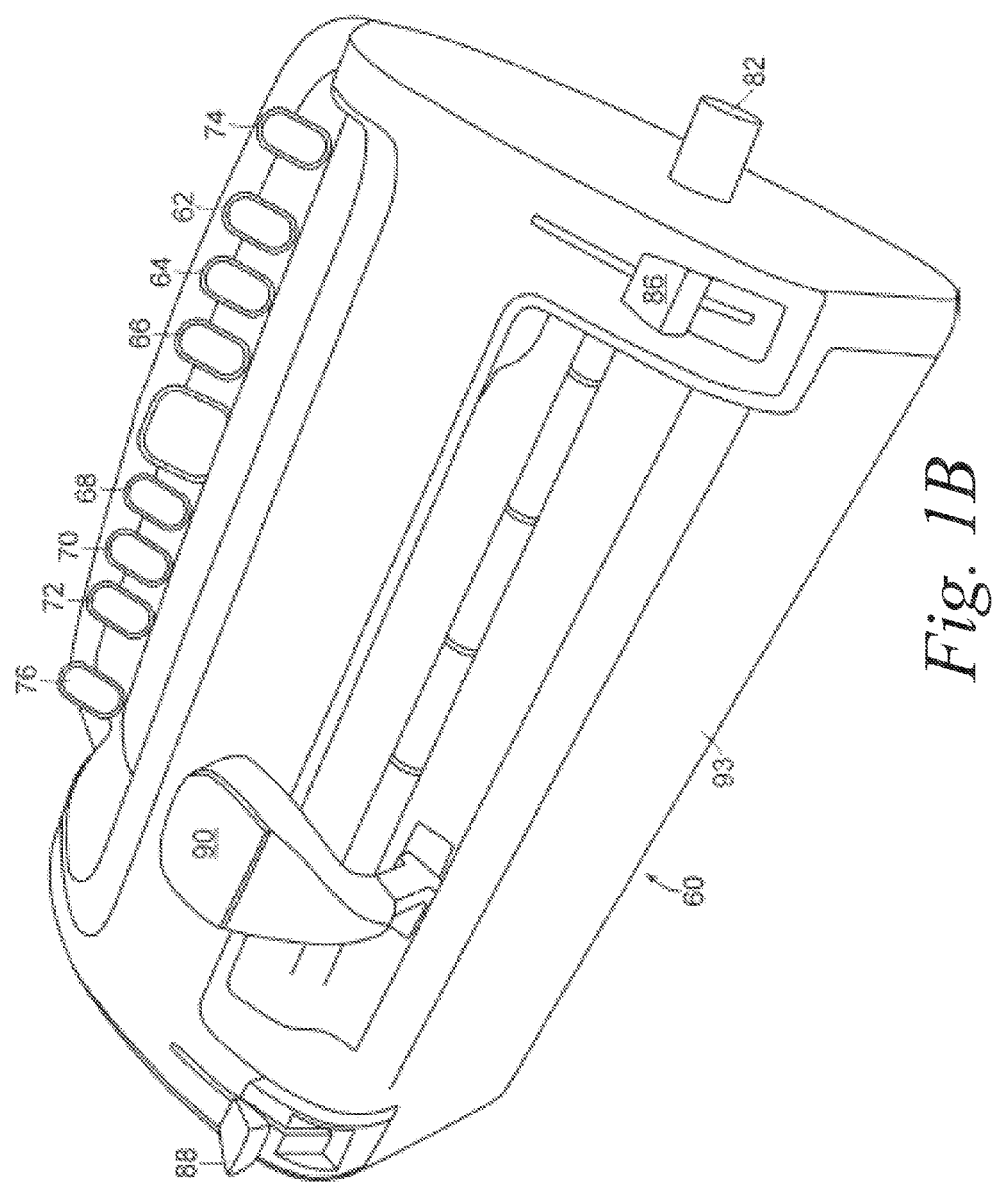
FIG. 1B is a block diagram of a perspective, rear view of an embodiment of a mechanical Braille writer.
Figure 1C:
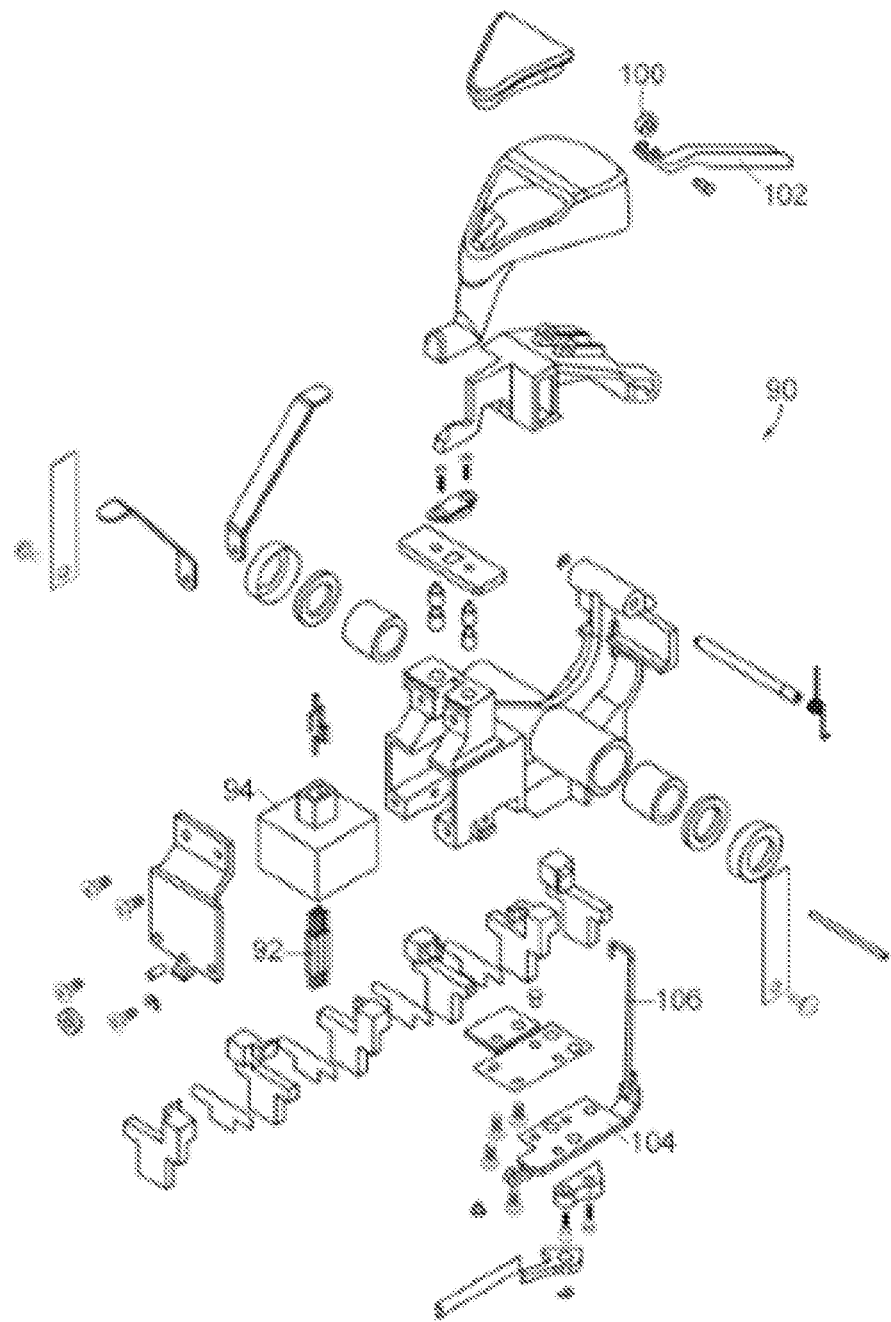
FIG. 1C is a block diagram of an exploded, perspective view of an embodiment of a mechanical embossing mechanism.
Figure 1D:
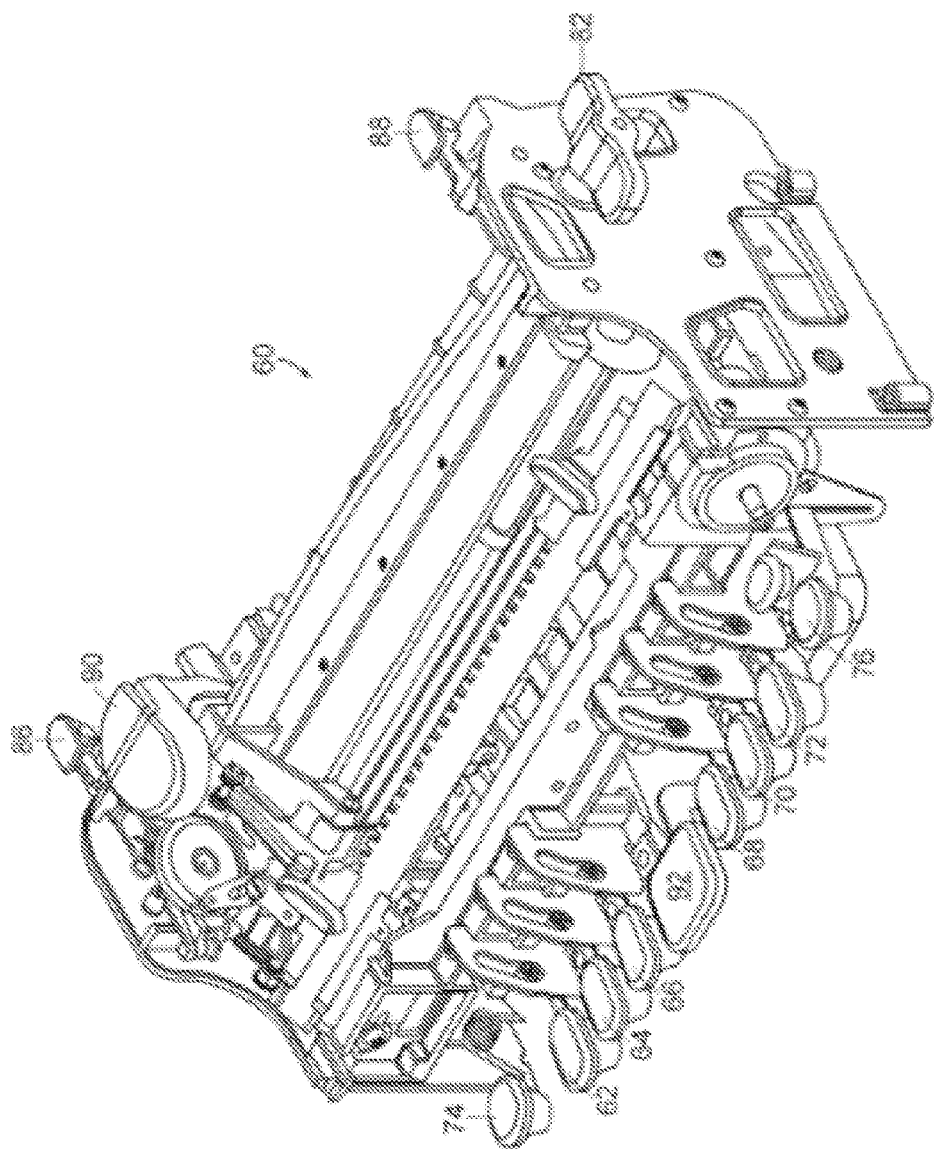
FIG. 1D is a block diagram of a perspective view, with cover removed, of an embodiment of a mechanical Braille writer.
Figure 1E:
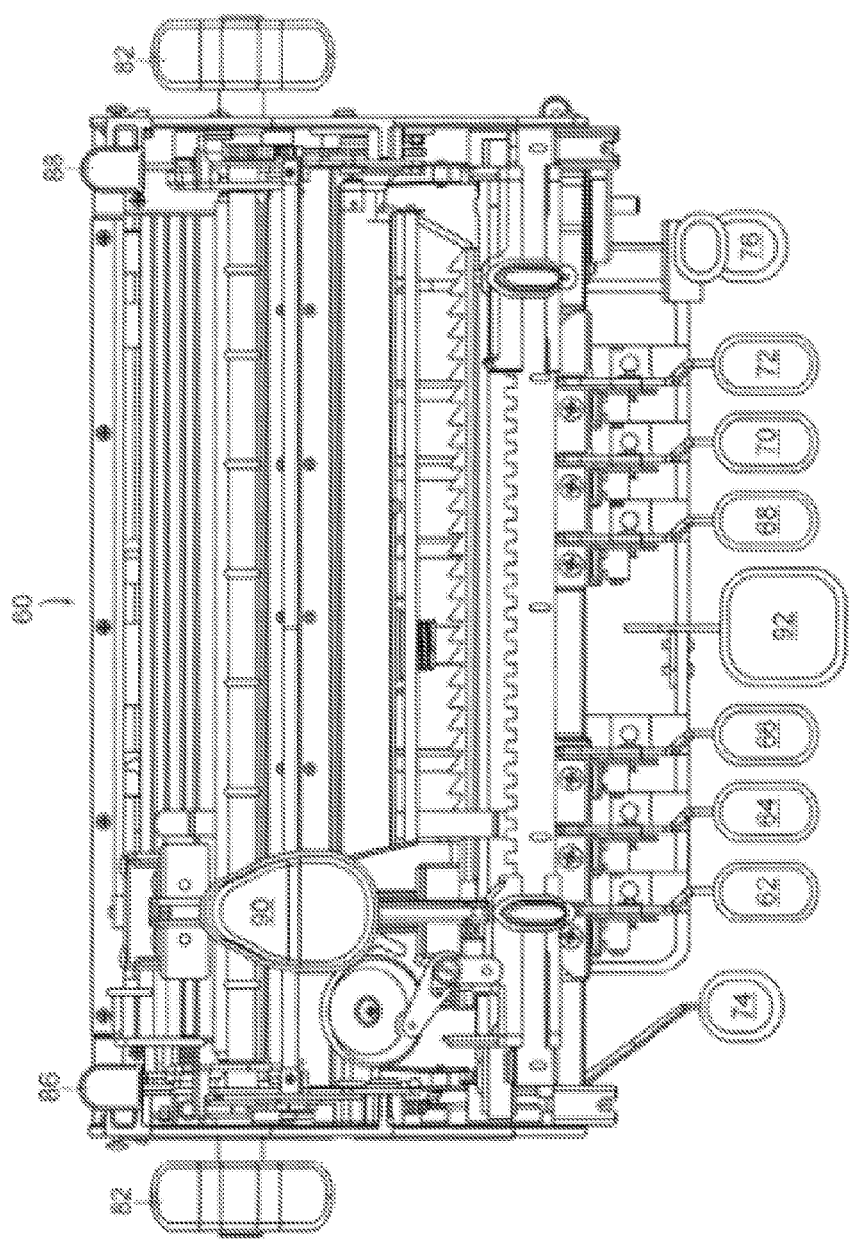
FIG. 1E is a block diagram of a plan view, with cover removed, of an embodiment of a mechanical Braille writer.

Illustrated in FIGS. 1A-1F are block diagrams of embodiments of a mechanical Braille writer 60. As shown in FIG. 1A, in one embodiment, the mechanical Braille writer 60 includes embossing keys 62-72, a line spacing key 74 and a back space key 76. In some embodiments, the mechanical Braille writer 60 includes margin guides 78 and 80 at the front of the Braille writer 60. In many embodiments, the Braille writer 60 may include paper advance knobs 82 and 84, which may comprise a "wingnut" configuration for ease of gripping. In some embodiments, Braille writer 60 may include paper release levers 86 and 88. In one embodiment, Braille writer 60 may include an embossing mechanism or carriage assembly 90. In many embodiments, a front portion 91 of the Braille writer 60 may serve as an integrated handle. Referring to FIG. 1B, a Braille writer 60 may include a moveable panel 93, which may serve as an integrated paper tray, reading rest and alignment surface. Referring ahead to FIG. 1E, a Braille writer 60 may include a paper drum assembly.

An embodiment of an embossing mechanism or carriage assembly 90 will now be described in more detail in conjunction with FIG. 1C. In some embodiments, the mechanism 90 may include an array of six pins 92 that are slidingly guided by structure 94. In many embodiments, the pins in the array of pins 92 are straight and identical to one another, allowing for ease of assembly and adjustment.

Still referring to FIG. 1C, also shown is a carriage head release mechanism. A button 100 may be pushed downwardly onto a beam 102. The beam 102 then lifts a cell spacer assembly 104 by means of a hooked wire 106. Thus, pushing the button 100 results in the lifting of the cell spacer assembly 104 away from the rack bar thereby releasing the carriage.

In operation, a user may depress one of the embossing keys 62-72, causing a corresponding one of the pins in the array 92 to extend so as to emboss a raised dot on paper (not shown) passing between surfaces of the embossing mechanism 90. After a letter is created, the user activates a spacebar 92 to prepare for embossing a next letter. In another embodiment, spacebar 92 may be mechanically linked to embossing keys 62-72 such that upon release of all depressed embossing keys 62-72, the embossing mechanism 90 is moved to the next Braille cell.

Figure 1F:
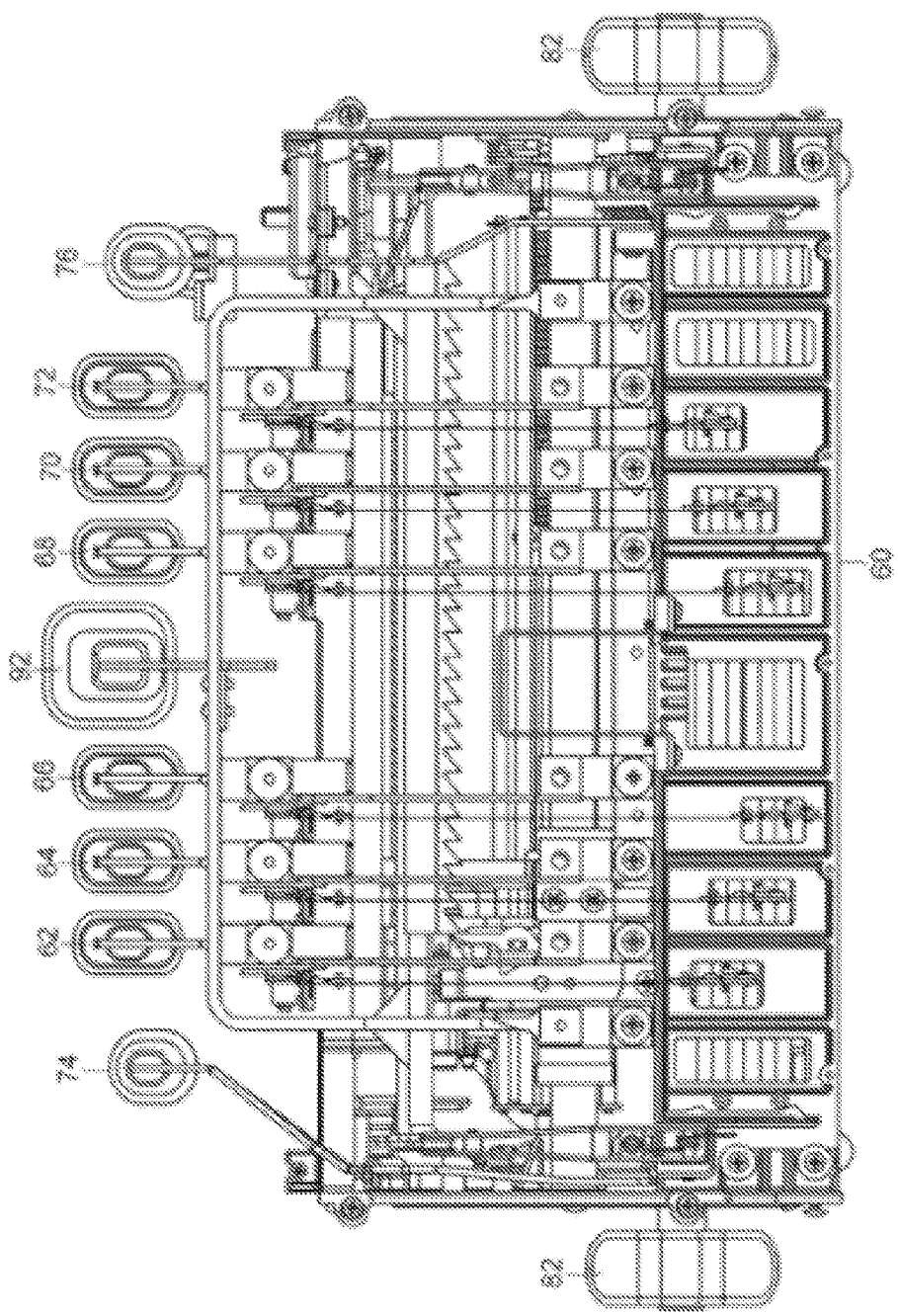
FIG. 1F is a block diagram of a bottom view of an embodiment of a mechanical Braille writer.

FIGS. 1D, 1E and 1F illustrate cutaway views of embodiments of a mechanical Braille writer, showing the mechanical interconnections that enable embossing. Referring back to FIG. 1C, each pin 92 is lifted by a corresponding lifter segment arranged from the front of the Braille writer to the back and shown below pins 92. Referring now to FIG. 1F which shows a cutaway view from below Braille writer 60, embossing keys 62-72 are connected via levers to a plurality of bars running horizontally across the Braille writer 60 (although shown running from top to bottom in the rotated view of FIG. 1F). Each of the plurality of bars correspond to the plurality of lifter segments shown in FIG. 1C, such that lifting the bar raises the lifter segment of the embosser head and the corresponding pin, no matter where across a page the embosser head is stationed.

B. Erasure Mechanism

As discussed above, an improved Braille erasure mechanism may comprise a reverse-embosser or impressing mechanism to imprint a negative Braille cell. A Braille erasure mechanism may be variously referred to as an erasure mechanism, an erase mechanism, an erasure assembly, or any combination or variation of these terms. A negative Braille cell is the reverse of a normal Braille cell, with one or more dots lowered or pressed into the printing medium in an opposite direction to the raised dots of a normal Braille cell. Various formats of Braille exist, including 6-dot and 8-dot Braille. A cell in 6-dot Braille comprises one or more raised dots in a matrix three dots high by two dots wide. Similarly, a cell in 8-dot Braille comprises one or more raised dots in a matrix four dots high by two dots wide. A full Braille cell in either of these formats or any other Braille format is a cell in which every dot of the matrix is raised. A negative full Braille cell is thus a reversed or imprinted full Braille cell, with every dot of the matrix lowered or impressed into the printing medium.

Figure 2A:
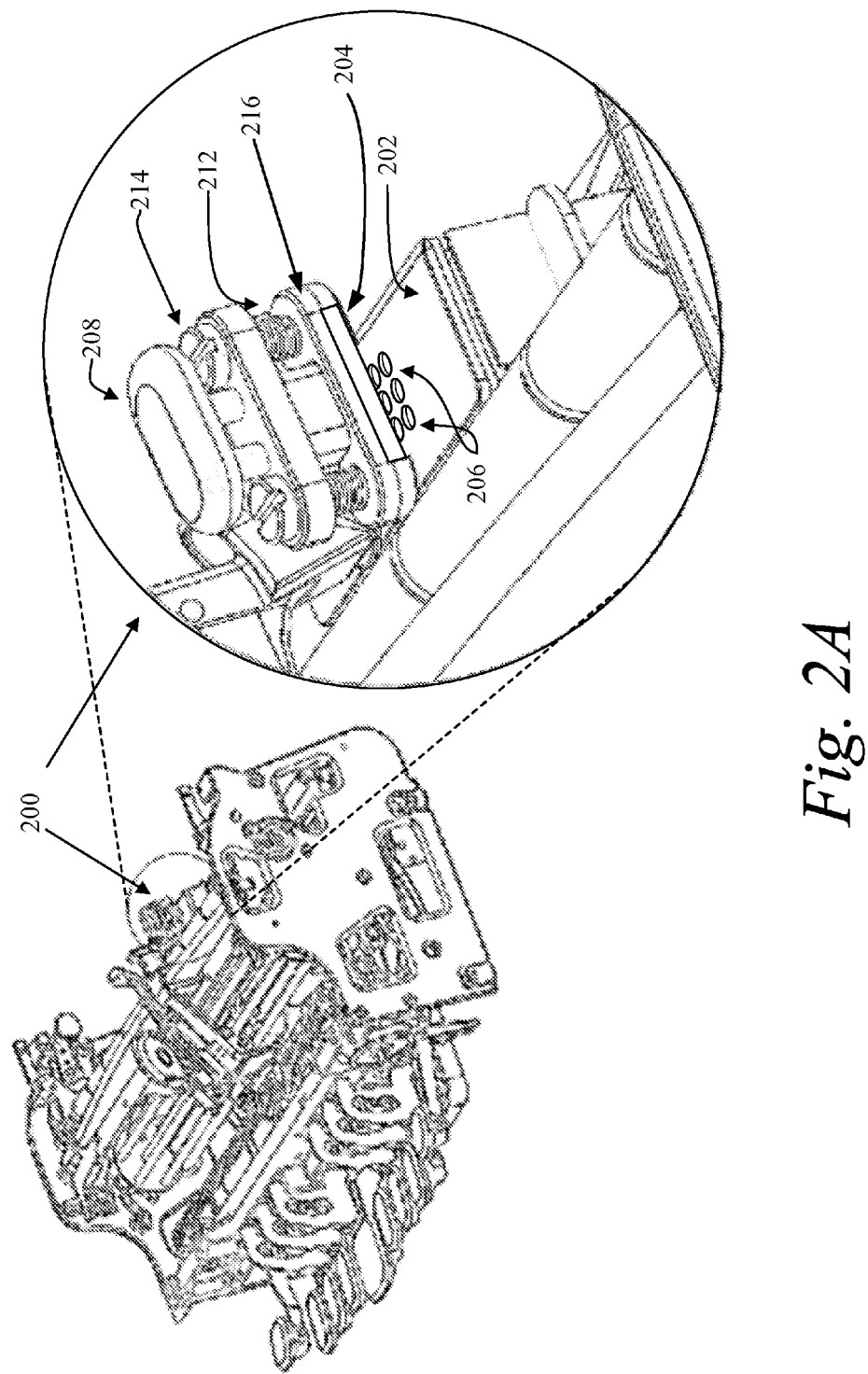
FIG. 2A is a block diagram depicting an embodiment of a mechanical Braille writer with a Braille erasure mechanism.

Shown in FIG. 2A is a block diagram depicting an embodiment of a mechanical Braille writer with a Braille erasure mechanism 200. FIG. 2A also includes an inset view of the Braille erasure mechanism 200 enlarged to show additional detail. As shown, in some embodiments, a Braille erasure mechanism 200 may comprise a first plate 202 and a second plate or solid element 204. Although referred to generally as a second plate 204, in many embodiments, second plate 204 may comprise a bottom surface of a unitary element. This unitary element may include a button or lever 208 and/or a guide plate or pass-through holes for guide elements 214, both of which discussed in more detail below. The unitary element, in some embodiments and particularly when comprising both second plate 204 and button 208, may be referred to as an actuator or embosser. First plate 202 may include a plurality of indents 206, sometimes referred to as female elements or elements recessed into the plate, arranged in a full Braille cell. In some embodiments, first plate 202 may also comprise a guide plate for the plurality of pins 92 shown in FIG. 1C. For example, in one embodiment shown in more detail in FIG. 2D, the plurality of indents 206 may be located adjacent to a plurality of guide holes for the plurality of pins 92. In a further embodiment, the plurality of indents 206 may be arranged in a full Braille cell adjacent to the guide holes for the plurality of pins 92 at a spacing equal to the distance between two embossed Braille cells. Accordingly, if a user of a Braille writer with an erase mechanism in this embodiment back spaces after embossing a cell, the plurality of indents 206 may be located precisely under the cell to be erased. In a further embodiment, in which the embossing mechanism advances by one cell after embossing the cell, the user may back space twice to position the plurality of indents 206 beneath the last cell embossed. In other embodiments, the user may back space one or more times to position the plurality of indents 206 beneath a cell to be erased.

Figure 2B:
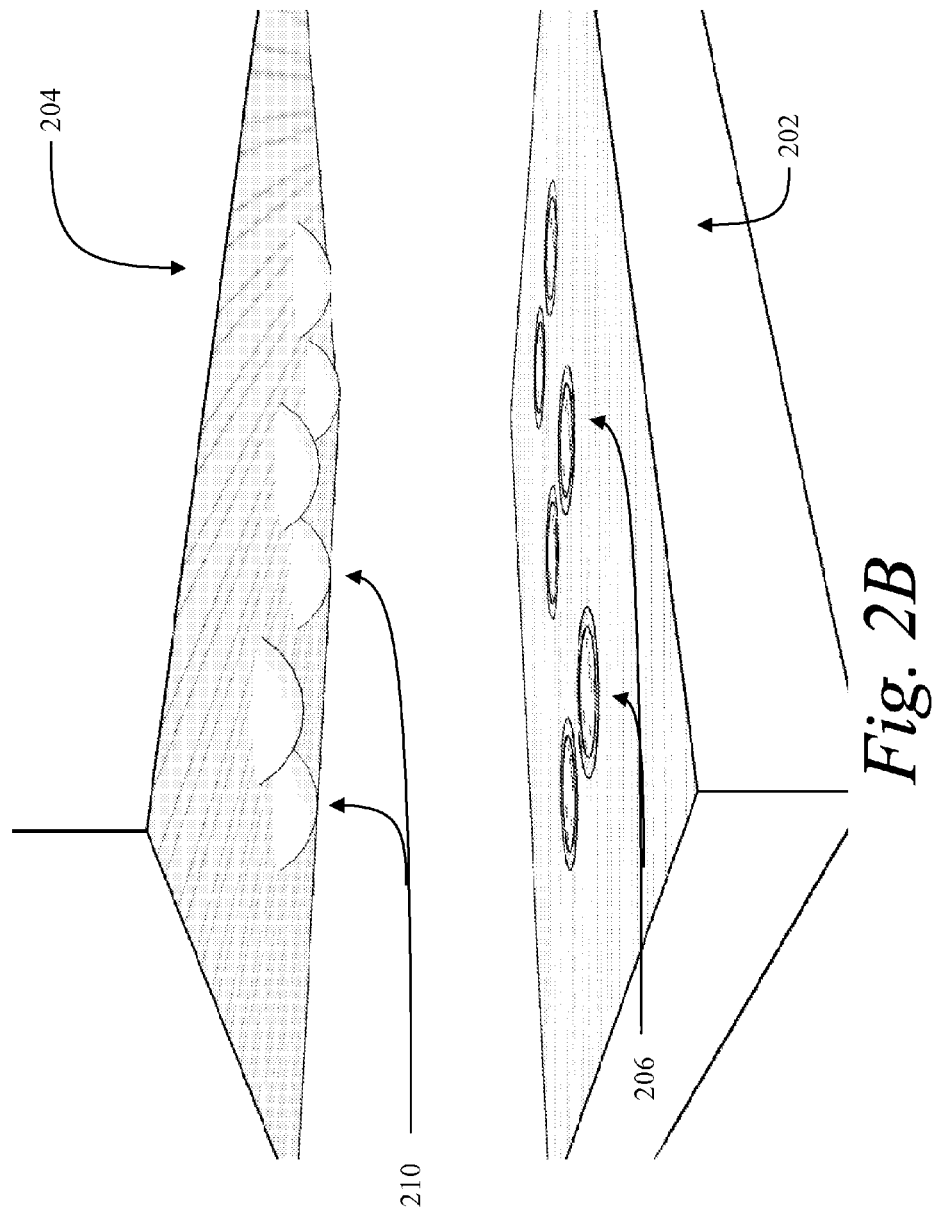
FIG. 2B is a three-dimensional view of a block diagram of an embodiment of a Braille erasure mechanism.

Referring briefly ahead to FIG. 2B, shown is a three-dimensional view of a block diagram of an embodiment of a Braille erasure mechanism. As discussed above, a first plate 202 may include a plurality of indents 206 arranged in a full Braille cell. In some embodiments, second plate 204 may include a corresponding plurality of raised or protruding elements 210, sometimes referred to as male elements, arranged in a full Braille cell and positioned above the plurality of indents 206. When a printing medium is compressed between first plate 202 and second plate 204, the plurality of raised elements 210 and corresponding plurality of indents 206 impress a negative full Braille cell in the printing medium. If this compression is performed on top of an embossed Braille cell, all of the raised dots of the embossed Braille cell and any unraised dots of the cell will be impressed into a negative full Braille cell. If a Braille cell is later embossed in the same location as the negative full Braille cell, one or more dots of the embossed cell will be raised, while any dots left unembossed will remain impressed in the negative cell. For example, if the first dot (left column, top row) is raised to emboss the letter a, the resulting cell will include the first dot raised and the remaining dots lowered and undetectable by the Braille reader. In some embodiments, second plate 204 may be referred to as a male embossing element or male pattern, and first plate 202 may be referred to as a female embossing element or female pattern. Collectively, second plate 204 and first plate 202 may be referred to as an embosser, an indenting embosser, a negative embosser, or a matched embosser. In some embodiments, the plurality of indents 206 may have diameters equal to or larger than the diameters of the plurality of raised elements 210. This may be done to prevent cutting the printing medium.

Returning to FIG. 2A, the embodiment of the erase mechanism 200 shown also includes a button 208. In some embodiments, button 208 comprises a lever or button connected to second plate 204, such that pressing the lever or button causes the second plate 204 to be pressed against first plate 202 or compress a printing medium between second plate 204 and first plate 202. As discussed in more detail below in connection with FIG. 2C, in some embodiments, button 208 may be immovably connected to second plate 204 or comprise an element of a unitary solid comprising both button 208 and second plate 204.

In some embodiments, erase mechanism 200 may include a guide plate 216. Guide plate 216 may comprise a plate with a hole or cutout to allow second plate 204 or a unitary actuator comprising second plate 204 to slide with one degree of freedom with the face of second plate 204 with raised elements 210 parallel to the face of first plate 202 with indents 206. In many embodiments, this hole or cutout may be substantially the same shape as a cross-section of second plate 204 or a unitary actuator comprising second plate 204 and be of at least the same size. In some embodiments, and discussed in more detail below in connection with FIGS. 2C and 2D, guide plate 216 may be connected to carriage 90, such that second plate 204 is at a fixed horizontal spacing from the embossing pins.

As shown, in some embodiments, erase mechanism 200 may include one or more guide elements or posts 214, referred to generally as guide elements. In some embodiments, and shown in more detail in FIG. 2C, guide elements 214 may be threaded or partially threaded and screwed into corresponding holes of guide plate 216. In some embodiments, guide elements 214 may pass through corresponding holes in an upper portion of a unitary actuator comprising second plate 204. In a further embodiment, an enlarged portion or head of each guide element 214 may serve as a stop for the unitary actuator comprising second plate 204. In some embodiments, the erase mechanism 200 may include one or more springs 212 around each guide element 214, to return second plate 204 to a position separated from the printing medium or first plate 202 after impressing the negative Braille cell. Thus, in these embodiments, pressing button 208 lowers second plate 204 or a unitary actuator comprising second plate 204 along the guide element or elements 214, compressing spring or springs 212, to press against the guide plate 216, limiting the range of travel and resulting pressure of the raised embossing elements 210 against first plate 202.

Although erase mechanism 200 is shown in FIG. 2A as manually actuated by pressing button 208, in some embodiments, erase mechanism 200 may be electric or electrically assisted. In one embodiment, erase mechanism 200 may include one or more solenoids oriented to press second plate 204 against first plate 202 or compress a printing medium between second plate 204 and first plate 202. Accordingly, in these embodiments, button or lever 208 shown in FIG. 2A may not be included.

Figure 2C:
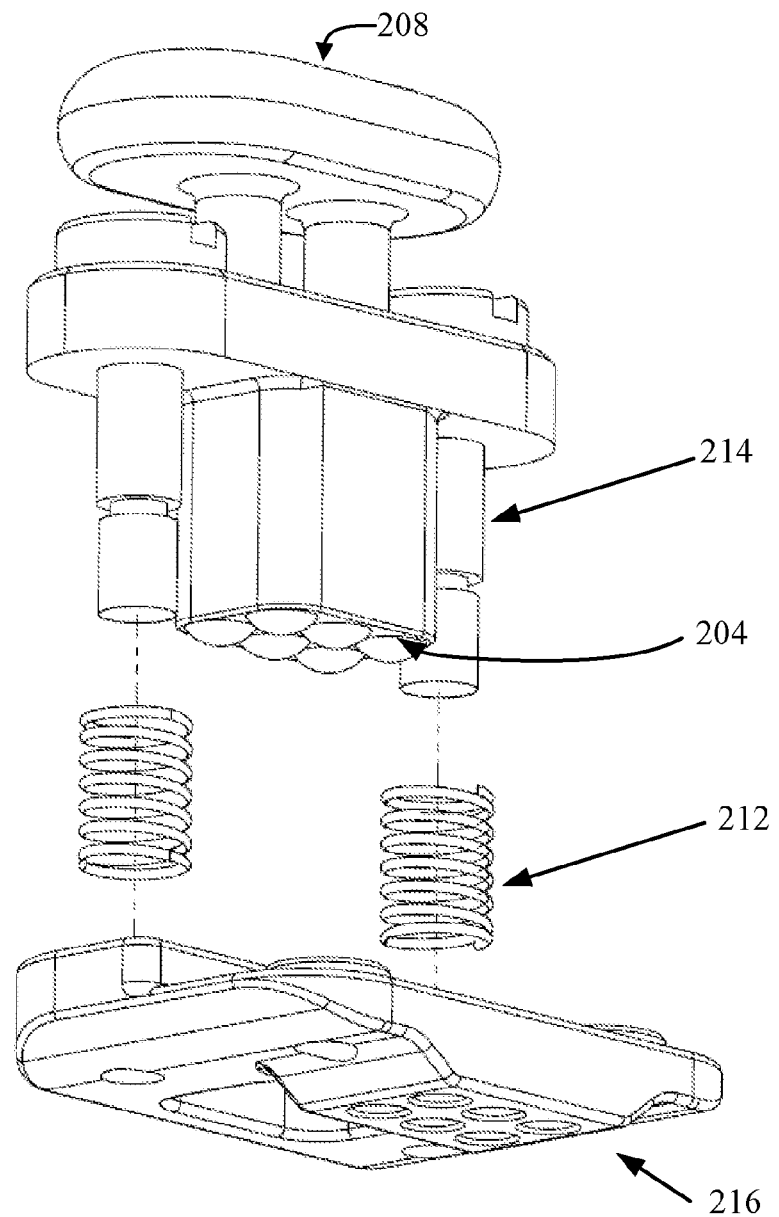
FIG. 2C is a block diagram of an exploded, perspective view of an embodiment of a Braille erasure mechanism.

Referring now to FIG. 2C, shown is a block diagram of an exploded, perspective view of an embodiment of a Braille erasure mechanism. As shown, second plate 204 or a unitary actuator comprising second plate 204 includes or is connected to button 208. Guide plate 216 includes a hole of the same shape as a cross-section of the lower portion of the unitary actuator, to allow the lower portion of the actuator comprising second plate 204 to slide through the hole with one degree of freedom. Guide elements 214 pass through holes in the upper portion of the unitary actuator and springs 212 and connect to guide plate 216, providing additional restraint on any horizontal motion of second plate 204 or the unitary actuator comprising second plate 204 and providing an upper stop to the vertical motion of the unitary actuator. In some embodiments, as shown, guide plate 216 may include a plurality of indents arranged in a full Braille cell. These indents may be fixed in a position opposite the plurality of pins 92 of the embossing mechanism 90. In one embodiment, as shown, guide plate 216 may have a lowered or thickened portion that includes the plurality of indents. This may be done to allow second plate 204, in its inactivated position, to be at a larger distance from the printing material and any previously embossed Braille cells on said printing material.

Figure 2D:
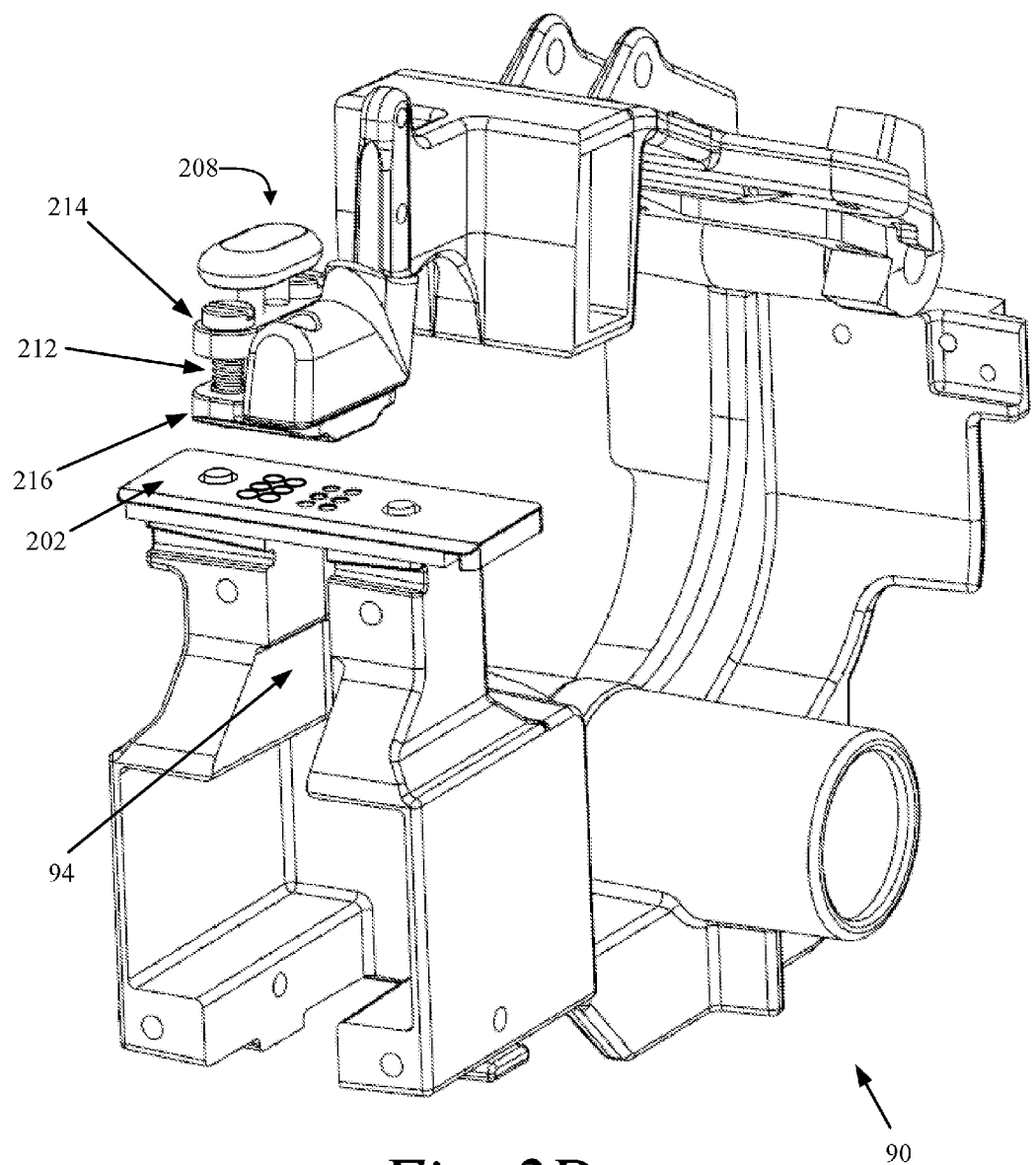
FIG. 2D is a block diagram of an of an embodiment of a Braille erasure mechanism showing positioning with respect to a carriage element.

Referring briefly to FIG. 2D, shown is a block diagram of an of an embodiment of a Braille erasure mechanism showing positioning with respect to first plate 202, a carriage element of embossing mechanism 90 and guide block 94 for the plurality of pins 92. As shown, in some embodiments, guide plate 216 may attach to the embossing mechanism such that the erase mechanism is at a fixed horizontal distance from the carriage position.

Figure 3:
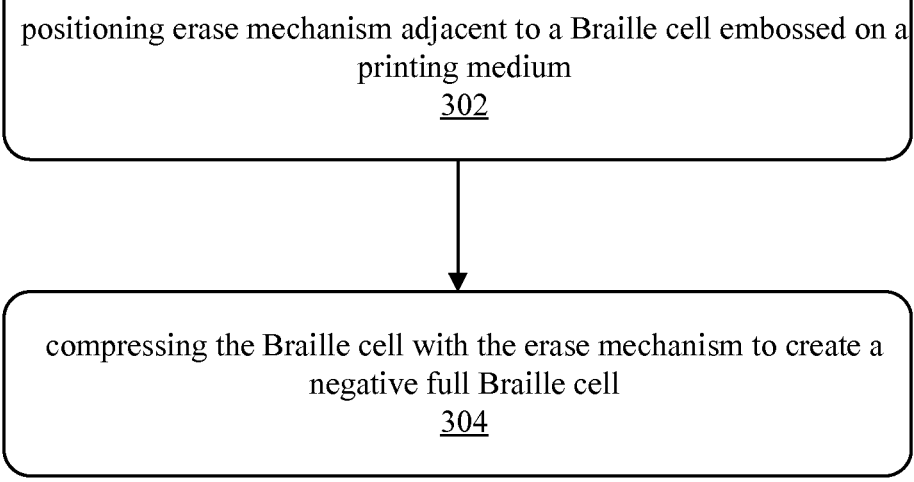
FIG. 3 is a flow chart of an embodiment of a method of erasing an embossed Braille cell.

Referring now to FIG. 3, illustrated is a flow chart of a method 300 of erasing an embossed Braille cell. At step 302, an erase mechanism is positioned adjacent to or above a Braille cell embossed on a printing medium. In some embodiments, as discussed above, the erase mechanism includes a first plate with a plurality of raised elements arranged in a full Braille cell and a second plate with a corresponding plurality of indents arranged in a full Braille cell. Accordingly, in some embodiments, positioning the erase mechanism adjacent to or above the Braille cell embossed on the printing medium may comprise positioning the plate with the plurality of raised elements alongside the raised side of the embossed Braille cell or in opposition to one or more raised elements of the embossed Braille cell. Additionally, positioning the erase mechanism adjacent to the Braille cell may comprise positioning the first plate with the plurality of raised elements on one side of the printing medium and the second plate with the plurality of indents on the opposite side of the printing medium. In an embodiment in which the erase mechanism is connected to an embossing mechanism, the first plate with the plurality of raised elements may be connected or attached to a striker plate for a plurality of pins of the embossing mechanism, and the second plate with the plurality of indents may be connected or attached to a guide plate for the plurality of pins.

At step 304, in some embodiments, the Braille cell embossed on the printing medium may be compressed between the first plate and the second plate to create a negative full Braille cell. In one embodiment, compressing the Braille cell between the first plate and second plate to create a negative full Braille cell may comprise impressing a full Braille cell in the same location as the embossed Braille cell, such that one or more raised dots of the embossed Braille cell are lowered beyond a surface of the printing medium.

Having described certain embodiments of methods and systems for erasing Braille embossing, it will now become apparent to one of skill in the art that other embodiments incorporating the concepts of the invention may be used.

What is claimed:

1. A method of erasing an embossed Braille cell, the method comprising:
   positioning an erase mechanism adjacent to a Braille cell embossed on a printing medium comprising at least one raised dot, the erase mechanism comprising a first plate having a first flat portion and a plurality of raised elements arranged in a full Braille cell and extending beyond the first flat portion, a second plate with a corresponding second flat portion and a plurality of indents arranged in a full Braille cell, and an actuator for pressing the first plate and the second plate together, the first plate placed alongside the at least one raised dot of the embossed Braille cell; and
   compressing the Braille cell embossed on the printing medium between the first plate and second plate to create a negative embossed full Braille cell comprising a plurality of lowered dots, the printing medium in contact with the first flat portion and second flat portion during compression.

2. The method of claim 1, wherein the erase mechanism is attached to a Braille embossing mechanism and positioning the erase mechanism comprises moving the Braille embossing mechanism by a distance of one or more widths of a Braille cell.

3. The method of claim 2, wherein positioning the erase mechanism adjacent to the Braille cell further comprises actuating a backspace mechanism to move the Braille embossing mechanism in a predetermined direction for a predetermined distance to position the plurality of indents beneath the last embossed Braille cell.

4. The method of claim 3, wherein the predetermined direction is in opposition to a direction of advancement of the Braile embossing mechanism during embossing.

5. The method of claim 3, wherein the predetermined distance is a distance between a first column of a first Braille cell and a corresponding first column of an adjacent Braille cell.

6. The method of claim 3, wherein the predetermined distance is a distance between a first column of a first Braille cell and a corresponding first column of a second Braille cell, separated from the first Braille cell by a third Braille cell.

7. The method of claim 3, wherein the predetermined distance is a multiple of a distance between a first column of a first Braille cell and a corresponding first column of an adjacent Braille cell.

8. The method of claim 2, further comprising:
   embossing the Braille cell, by the Braille embossing mechanism; and
   automatically advancing the Braille embossing mechanism in a first direction for a first distance to prepare to emboss a next Braille cell, subsequent to embossing the Braille cell;
   and wherein positioning the erase mechanism comprises advancing the Braille embossing mechanism in a second direction, opposite to the first direction, by a second distance.

9. The method of claim 8, wherein the second distance is twice the first distance.

10. The method of claim 8, wherein the first distance is a distance equal to a spacing of two Braille cells in the Braille system, and wherein the second distance is a distance equal to a spacing of three Braille cells in the Braille system.

11. The method of claim 1, wherein the Braille system comprises a 6-dot Braille system, and the first plate comprises six raised elements, and the second plate comprises six indents.

12. The method of claim 1, wherein the Braille system comprises an 8-dot Braille system, and the first plate comprises eight raised elements, and the second plate comprises eight indents.

13. The method of claim 1, wherein compressing the Braille cell further comprises pressing, by a user of the erase mechanism, the actuator of the erase mechanism.

* * * * *